(12) United States Patent
Arai et al.

(10) Patent No.: US 7,114,811 B2
(45) Date of Patent: Oct. 3, 2006

(54) OPTICAL ASSEMBLY AND PROJECTOR

(75) Inventors: Jun Arai, Matsumoto (JP); Eijiro Fujimori, Fujimi-machi (JP); Hideyuki Kobayashi, Shiojiri (JP); Shogo Kurosawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

(21) Appl. No.: 10/951,795

(22) Filed: Sep. 29, 2004

(65) Prior Publication Data

US 2005/0105054 A1    May 19, 2005

(30) Foreign Application Priority Data

Oct. 6, 2003    (JP)    ............... 2003-347132

(51) Int. Cl.
 G03B 21/14    (2006.01)
 G03B 21/02    (2006.01)

(52) U.S. Cl. ........................................ 353/20; 353/119

(58) Field of Classification Search ................... 353/20, 353/18, 96, 99
See application file for complete search history.

(56) References Cited

U.S. PATENT DOCUMENTS

| | | | |
|---|---|---|---|
| 6,523,959 B1 * | 2/2003 | Lee et al. | 353/52 |
| 6,722,768 B1 * | 4/2004 | Takezawa | 353/20 |
| 6,726,330 B1 * | 4/2004 | Kitabayashi | 353/31 |
| 6,830,338 B1 * | 12/2004 | Ogawa | 353/20 |
| 2002/0191156 A1 * | 12/2002 | Watanabe | 353/20 |

FOREIGN PATENT DOCUMENTS

| | | |
|---|---|---|
| JP | 07-175018 | 7/1995 |
| JP | A 2000-221588 | 8/2000 |
| JP | 2001-042314 | 2/2001 |
| JP | 2001-194641 | 7/2001 |
| JP | 2001-201792 | 7/2001 |
| JP | 2001-222061 | 8/2001 |
| JP | 2001-228534 | 8/2001 |
| JP | A 2002-182213 | 6/2002 |
| JP | 2003-172975 | 6/2003 |
| JP | 2003-177352 | 6/2003 |
| JP | 2003-195254 | 7/2003 |
| JP | 2004-004206 | 1/2004 |
| JP | 2004-138913 | 5/2004 |

* cited by examiner

*Primary Examiner*—Melissa Jan Koval
*Assistant Examiner*—Andrew Kong
(74) *Attorney, Agent, or Firm*—Oliff & Berridge, PLC.

(57) ABSTRACT

To provide an optical assembly capable of enhancing black level display while preventing deterioration of a WV film, and a projector assembled therewith, optical compensation elements are disposed before and after liquid crystal light valves, so that an unintended phase difference generated on the incident and emission sides of the liquid crystal light valves for individual colors is eliminated by adjusting the rotational positions of the optical compensation elements, thus enabling an enhancement in the contrast of a color image displayed on a transmission screen member. In case of B light including ultraviolet light in part, the optical compensation element is disposed at the subsequent stage of the liquid crystal light valve, so that as compared with when the optical compensation element is disposed at the preceding stage of the liquid crystal light valve, the optical compensation element can be reduced or prevented from deteriorating with age, thus enabling the contrast of image display to be maintained over a long period of time.

7 Claims, 9 Drawing Sheets

OPTICAL ASSEMBLY AND PROJECTOR

BACKGROUND OF THE INVENTION

1. Field of Invention

Exemplary aspects of the present invention relate to an optical assembly including a liquid crystal element and another optical modulation device, and to a projector assembled with such an optical assembly.

2. Description of Related Art

A related art projection type liquid crystal display apparatus includes a liquid crystal display element for optical modulation, an incident side polarizing plate disposed on the incident side of the liquid crystal display element, an emission side polarizing plate disposed on the emission side thereof, and a pair of optical compensation elements one of which is disposed between the liquid crystal display element and the incident side polarizing plate, and the other of which is disposed between the liquid crystal display element and the emission side polarizing plate (see JP-A-2002-182213). In this related art projection type liquid crystal display apparatus, the optical compensation elements paired are each made up of a wide view film (hereinafter "WV film") and each rotatable within a plane perpendicular to an optical axis. Thus, both WV films are appropriately rotated to accurately align the directions of their optical axes with a rubbing direction of the liquid crystal display apparatus, thereby compensating a phase difference that remains on the incident and emission sides when an electrical field is formed in a liquid crystal layer, thus enabling an enhancement in black level display.

However, when the WV film is disposed on the incident side of the liquid crystal element as in the above projection type liquid crystal display apparatus, the WV film is exposed to strong illumination light, so that its characteristics gradually deteriorate due to a change with age. Particularly, when ultraviolet light is included in the illumination light, the WV film undergoes significant deterioration, so that there arises the need to replace the WV film earlier in order to maintain the image quality of a projected image.

In a color display type projector, for example, a cross dichroic prism is disposed on the emission side of the liquid crystal display element. However, because of the cost of such a cross dichroic prism and a limitation in the back focus of a projection lens, a space for assembling the WV film, the polarizing plate, etc. cannot be sufficiently ensured between the liquid crystal display element and the cross dichroic prism. Consequently, the WV film, the polarizing plate, etc. come into a close-packed state and thus become insufficiently cooled, or as regards the WV film on the emission side, it is obliged to omit the system of adjusting the rotational position thereof.

Accordingly, exemplary aspects of the invention provide an optical assembly capable of enhancing black level display while reducing or preventing deterioration of a WV film, and a projector assembled therewith.

Exemplary aspects of the invention provide an optical assembly in which the WV film can be appropriately rotated even when a color combining optical system is disposed on the emission side of a liquid crystal display element, and a projector assembled therewith.

SUMMARY OF THE INVENTION

To address and/or solve the above and/or other problems, an optical assembly according to an exemplary aspect of the invention includes: (a) an optical unit for a predetermined color having a transmissive optical modulation element that is illuminated by illumination light, a first polarizing plate disposed directly opposite the incident side of the optical modulation element, a second polarizing plate disposed on the emission side of the optical modulation element, an optical compensation element disposed between the optical modulation element and the second polarizing plate, and a holding member to hold the optical compensation element so as to allow adjustment of the rotational position thereof about an optical axis; and (b) a light combining device that is disposed on the emission side of the second polarizing plate assembled in the optical unit and that combines image light from the optical unit for the predetermined color and image light of another color and emits the combined image light. Here, the optical modulation element means a display element of the type to read an image utilizing polarization as typified by a liquid crystal display element.

In the above optical assembly, the optical compensation element whose rotational position can be adjusted by the holding member is disposed between the optical modulation element and the second polarizing plate. Therefore, for example, an unintended birefringent action, i.e., the phase difference generated on the incident and emission sides of the optical modulation element is eliminated by adjusting the rotational position of the optical compensation element, thus enabling an enhancement in the contrast of image display. Furthermore, the first polarizing plate is disposed directly opposite the incident side of the optical modulation element. Therefore, the optical compensation element can be reduced or prevented from deteriorating with age, as compared with when the optical compensation element is disposed between the optical modulation element and the first polarizing plate. That is, when disposed on the incident side of the optical modulation element, the optical compensation element is exposed to comparatively strong illumination light, so that its optical characteristics are easy to change. And, particularly, when illumination light including ultraviolet light is incident on the optical compensation element, it becomes necessary to replace the optical compensation element at periodic intervals. In the optical assembly of an exemplary aspect of the invention, the optical compensation element is disposed only on the emission side of the optical modulation element. Therefore, the optical modulation element serves as a filter to enable reduction or prevention of the deterioration in characteristics of the optical compensation element, so that the contrast of image display can be maintained over a long period of time.

In an exemplary aspect of the invention, the holding member has: a movable frame to fix the optical compensation element; a main body member to house the movable frame and supporting the movable frame rotatably about the optical axis via a pivot shaft; and an adjusting screw to adjust a predetermined portion provided in the periphery of the movable frame to fix the movable frame to the main body member in a direction perpendicular to the optical axis. In this case, the optical compensation element is fixed to the movable frame, so that it becomes possible to stably hold the optical compensation element and the optical compensation element can be easily and precisely rotated by the movable frame supported on the pivot shaft.

In another exemplary aspect of the invention, the main body member houses a stationary frame to hold the second polarizing plate. In this case, the optical compensation element and the second polarizing plate can be integrally housed in the holding member, which can reduce the distance between the optical modulation element for each color and the light combining device. Therefore, it is possible to increase the degree of freedom in designing the light combining device, a projection optical system arranged in the subsequent stage and the like. Additionally, the stationary frame can be formed integral with the main body member, and the movable frame can also be held sandwiched between the stationary frame and the main body member.

In yet another exemplary aspect of the invention, the movable frame detachably fixes the optical compensation element. In this case, the deteriorated optical compensation element can be replaced, so that imaging characteristics such as the contrast of image display can be enhanced at periodic intervals even with the optical compensation element being housed in a narrow space.

In yet another exemplary aspect of the invention, the movable frame holds the optical compensation element slidably in a lateral direction perpendicular to the optical axis in response to a predetermined or greater force, thereby allowing the optical compensation element to be detachable. In this case, by sliding the optical compensation element in a lateral direction perpendicular to the optical axis, the optical compensation element can be replaced with simplification and space saving being achieved, which can enhance workability in replacing the optical compensation element.

In yet another exemplary aspect of the invention, the holding member includes an air-cooling path to allow ventilation in a direction perpendicular to the optical axis. In this case, it becomes possible to effectively air-cool the optical unit.

In yet another exemplary aspect of the invention, the holding member is an assemblage of parts formed by sheet metal processing. In this case, a sufficiently wide air-cooling path can be ensured in the periphery of the optical compensation element, etc. while the optical compensation element, etc. are being stably held in a narrow space.

In yet another exemplary aspect of the invention, the light combining device is a cross dichroic prism with a pair of dielectric multilayer films built-in. In this case, image light of three colors can be collectively combined.

In yet another exemplary aspect of the invention, the holding member is adhered to an incident surface of the cross dichroic prism. In this case, the optical unit and the cross dichroic prism can be handled as a package and such an optical assembly can be handled as a unit, thus enabling an enhancement in workability of assembly, disassembly, repair, etc.

A projector of an exemplary aspect of the invention includes: (a) the optical assembly; (b) an illumination optical system to allow illumination light beams of individual colors including the predetermined color to be separately incident on the optical unit for the predetermined color and an optical unit for another color, respectively, which units are assembled in the optical assembly; and (c) a projection optical system to project the image light combined by way of the light combining device assembled in the optical assembly.

In the above projector, illumination light beams of individual colors are incident on optical modulation devices for the respective colors, then modulated into image light beams of the respective colors by the optical modulation devices for the respective colors, and thereafter combined by the light combining member. And, the image light combined by way of the projection optical system is projected onto a screen. On this occasion, such an optical assembly as above according to an exemplary aspect of the invention is used, so that it is possible to easily enhance the contrast of image display while reducing or preventing deterioration of the optical compensation element.

DETAILED DESCRIPTION OF EXEMPLARY EMBODIMENTS

Figure 1:
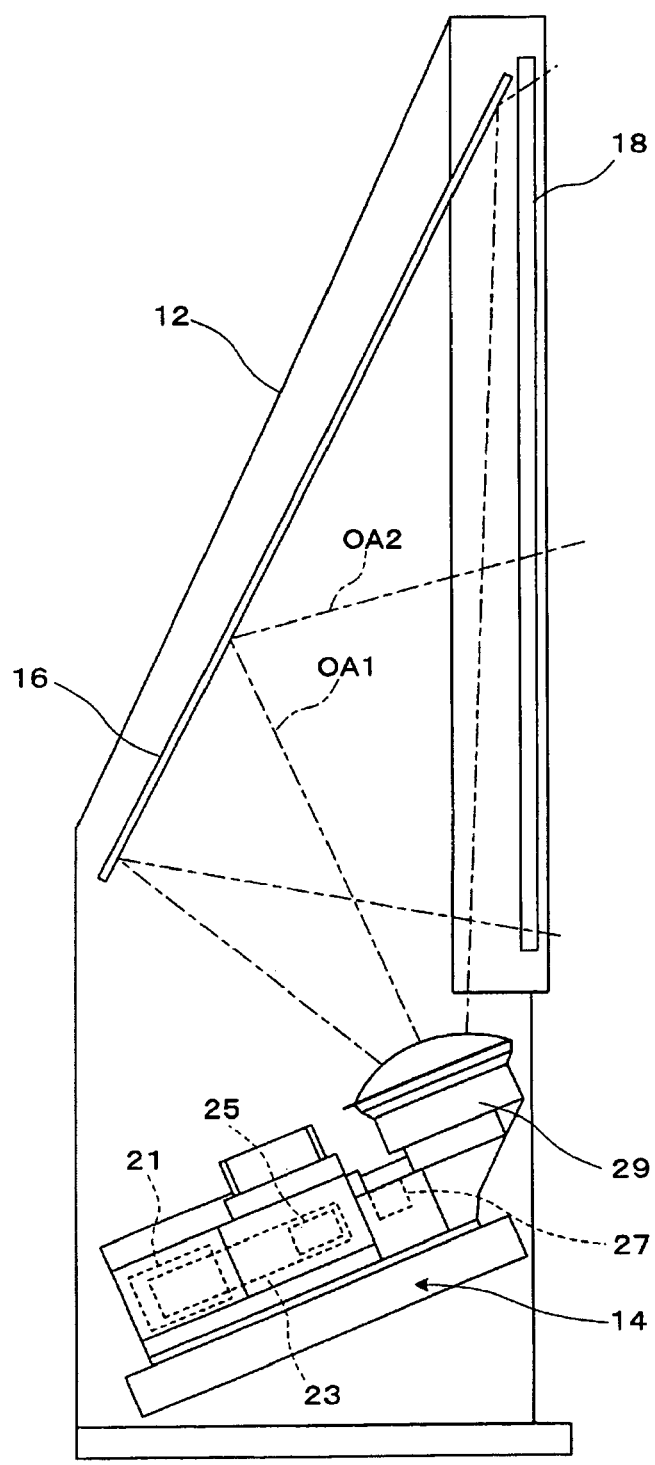
FIG. 1 is a schematic of a projector according to the invention.

FIG. 1 is a schematic illustrating an entire structure of a projector according to an exemplary embodiment of the invention. This projector 10 is a rear projection type apparatus for displaying images by rear projection. The projector 10 includes a projector main body 14 at the bottom of a casing 12 serving as a housing, a reflecting mirror 16 at the rear upper portion within the casing 12, and a transmission screen member 18 at the front of the casing 12. Image light emitted from the projector main body 14 travels diagonally upwardly in the rearward direction with an optical axis OA1 as its center, is bent toward the front side by the reflecting mirror 16 with an optical axis OA2 as its center, and is incident on a screen portion provided on the transmission screen member 18. Additionally, the projector main body 14, the reflecting mirror 16, and the transmission screen member 18 are positioned and fixed within the casing 12.

Figure 2:
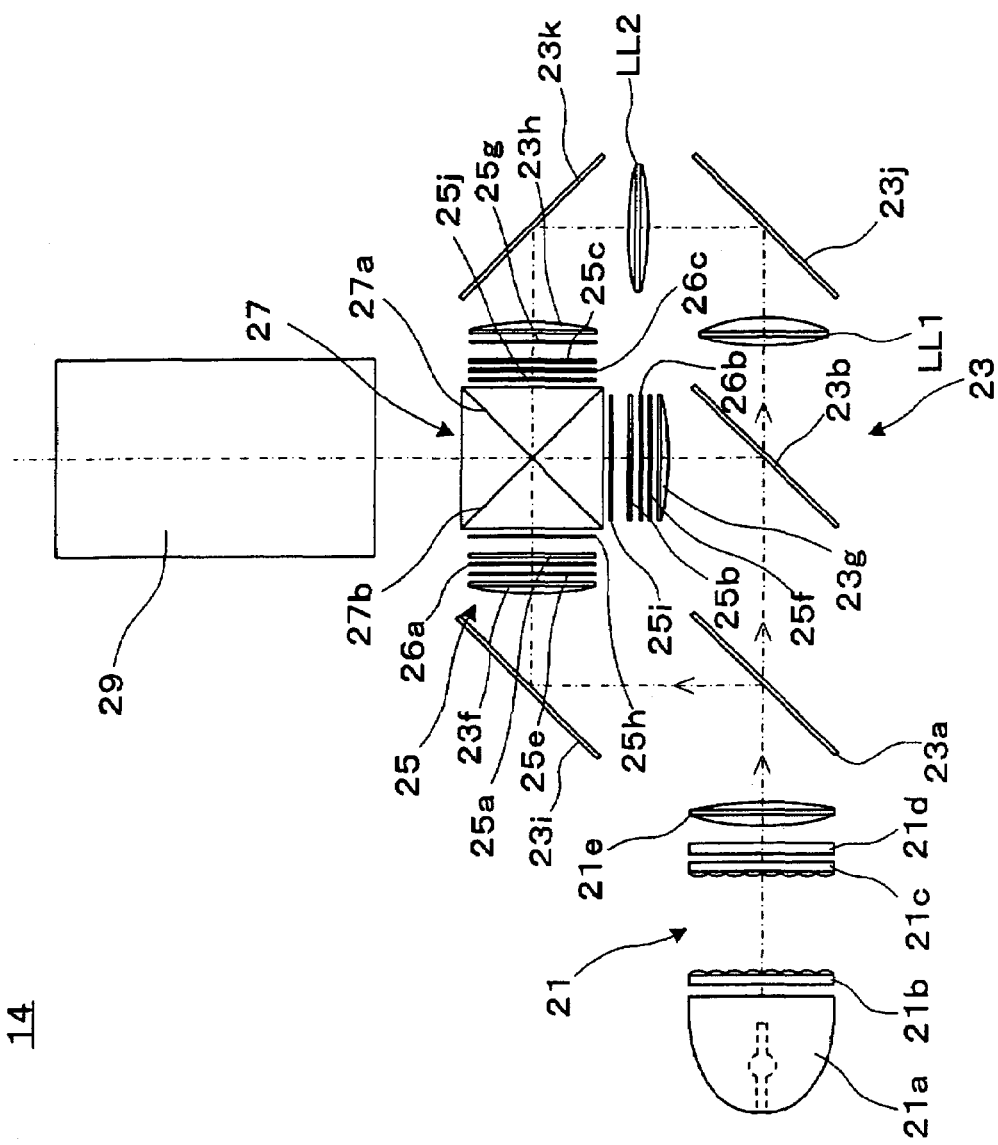
FIG. 2 is a schematic illustrating a structure of a projector main body shown in FIG. 1.

FIG. 2 is a schematic illustrating a structure of the projector main body 14 out of the projector 10 of FIG. 1. This projector main body 14 includes a light source device 21 to generate source light, a color separating optical system 23 to separate the source light from the light source device 21 into three colors of RGB, an optical modulation section 25 having three liquid crystal light valves 25a, 25b, 25c that are illuminated by illumination light beams of the respective colors emitted from the color separating optical system 23, a cross dichroic prism 27 serving as a light combining member to combine image light of the individual colors from the optical modulation section 25, and a projection lens 29 serving as a lens system to project the image light passed through the cross dichroic prism 27 onto the transmission screen member 18 (see FIG. 1).

The light source device 21 includes a source lamp 21a, a pair of fly's eye optical systems 21b, 21c, a polarization converting member 21d, and superposed lenses 21e. Here, the source lamp 21a, made up of a high pressure mercury lamp for example, has a concave mirror to collimate the source light. Besides, the fly's eye optical systems paired 21b, 21c, each made up of a plurality of elemental lenses disposed in a matrix, allow these elemental lenses to split the source light from the source lamp 21a into beams, thus separately collecting and diffusing the beams. The polarization converting member 21d converts the source light emitted from the fly's eye optical system 21c into only a P polarization component parallel to the plane of FIG. 2, thus supplying the P polarization component to the next stage optical system. The superposed lenses 21e appropriately converge the illumination light passed through the polarization converting member 21d as a whole, thus enabling superposed illumination on light modulation devices for the individual colors, i.e., the liquid crystal light valves. Specifically, the illumination light passed through both fly's eye optical systems 21b, 21c and the superposed lens 21e, passing through the color separating optical system 23 to be described in detail below, provides uniform superposed illumination to the liquid crystal light valves 25a to 25c for the individual colors provided in the optical modulation section 25.

The color separating optical system 23 includes first and second dichroic mirrors 23a, 23b, three field lenses 23f to 23h, and reflecting mirrors 23i, 23j, 23k, thus configuring an illumination device together with the light source device 21. The first dichroic mirror 23a reflects R light out of the three colors of RGB and allows transmission of G light and B light. Besides, the second dichroic mirror 23b reflects the G light out of two colors of GB and allows transmission of the B light. In this color separating optical system 23, the R light reflected by the first dichroic mirror 23a, passing through the reflecting mirror 23i, is incident on the field lens 23f to adjust the angle of incidence. Besides, the G light, passed through the first dichroic mirror 23a and reflected by the second dichroic mirror 23b, is incident on the field lens 23g. Furthermore, the B light passed through the second dichroic mirror 23b, passing through relay lenses LL1, LL2 to compensate an optical path difference and through the reflecting mirrors 23j, 23k, is incident on the field lens 23h to adjust the angle of incidence.

The optical modulation section 25 includes three liquid crystal light valves 25a to 25c each serving as an optical modulation device, three first polarizing filters 25e to 25g disposed on the incident sides of the liquid crystal light valve 25a to 25c, and three second polarizing filters 25h to 25j disposed on the emission sides of the liquid crystal light valve 25a to 25c. Optical compensation elements 26a, 26b are positioned between the liquid crystal light valves 25a, 25b and corresponding first polarizing filters 25e, 25f for the R light and G light, respectively. An optical compensation element 26c is disposed between the liquid crystal light valve 25c and second polarizing filter 25j for the B light. The R light reflected by the first dichroic mirror 23a is incident on the liquid crystal light valve 25a via the field lens 23f, etc., thus illuminating this liquid crystal light valve 25a. The G light, transmitted through the first dichroic mirror 23a and reflected by the second dichroic mirror 23b, is incident on the liquid crystal light valve 25b via the field lens 23g, etc., thus illuminating this liquid crystal light valve 25b. The B light transmitted through both the first and second dichroic mirrors 23a, 23b is incident on the liquid light valve 25c via the field lens 23h, etc., thus illuminating this liquid crystal light valve 25c. The liquid crystal light valves 25a to 25c are each a non-light-emission type optical modulation device to modulate the spatial intensity distribution of the incident illumination light. The light beams of the three colors incident on the respective liquid crystal light valves 25a to 25c are modulated in response to drive signals or image signals input as electrical signals into the liquid crystal light valves 25a to 25c. On that occasion, the first polarizing filters 25e to 25g adjust the polarization directions of the illumination light beams incident on the liquid crystal light valves 25a to 25c. At the same time, the second polarizing filters 25h to 25j take modulated light beams each having a predetermined polarization direction out of the modulated light beams that are emitted from the liquid crystal light valves 25a to 25c. Furthermore, the optical compensation elements 26a, 26b disposed on the incident sides of the liquid crystal light valves 25a, 25b for the R light and G light, and the optical compensation element 26c disposed on the emission side of the liquid crystal light valve 25c for the B light compensate a phase difference that remains when electric fields are formed in the liquid crystal layers of the liquid crystal light valves 25a to 25c, thus enhancing black level display.

The cross dichroic prism 27, being a light combining member, has embedded therein a dielectric multilayer film 27a for the R light and a dielectric multilayer film 27b for the B light, being crossed at right angles to each other. In the cross dichroic prism 27, the R light from the liquid crystal light valve 25a is reflected by the dielectric multilayer film 27a and emitted to the right side in the traveling direction. The G light from the liquid crystal valve 25b is advanced straight and emitted via the dielectric multilayer film 27a and a dielectric multilayer film 27b. The B light from the liquid crystal light valve 25c is reflected by the dielectric multilayer film 27b and emitted to the left side in the traveling direction. The composite light thus combined by the cross dichroic prism 27 is incident on the projection lens 29.

Figure 3:
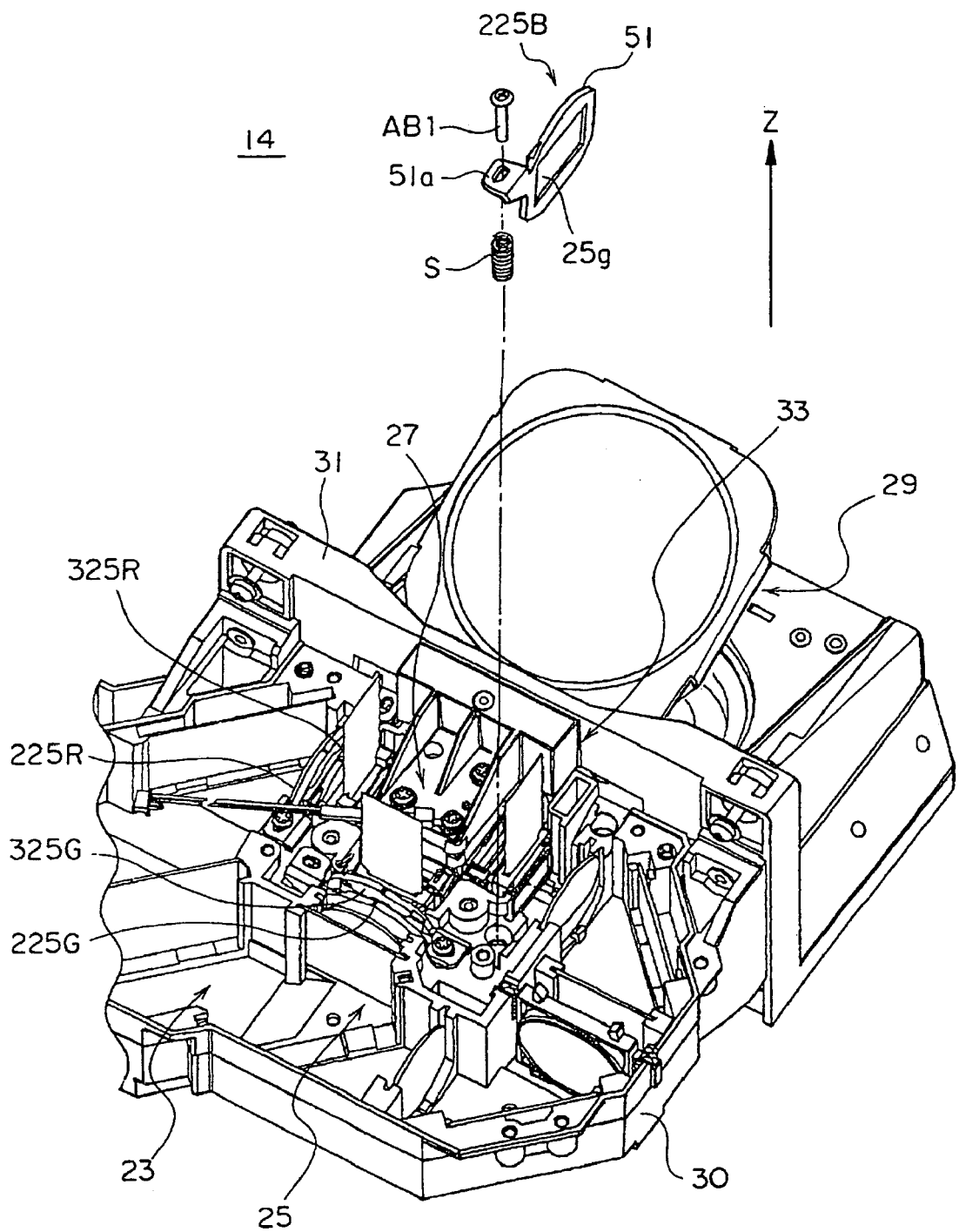
FIG. 3 is a schematic specifically illustrating an external structure of the projector main body.

FIG. 3 is a schematic illustrating an external structure of a main portion of the projector main body 14 of FIG. 1. The color separating optical system 23, the light source device the illustration of which is omitted, etc. are fixed, in alignment with each other, on a base member 30 provided in the projector main body 14. A mount member 31 is fixed to this base member 30, and the projection lens 29 and a POP (panel on prism) unit 33 made up of the cross dichroic prism 27, the optical modulation section 25, etc. are supported, in alignment with each other, via this mount member 31.

Figure 4:
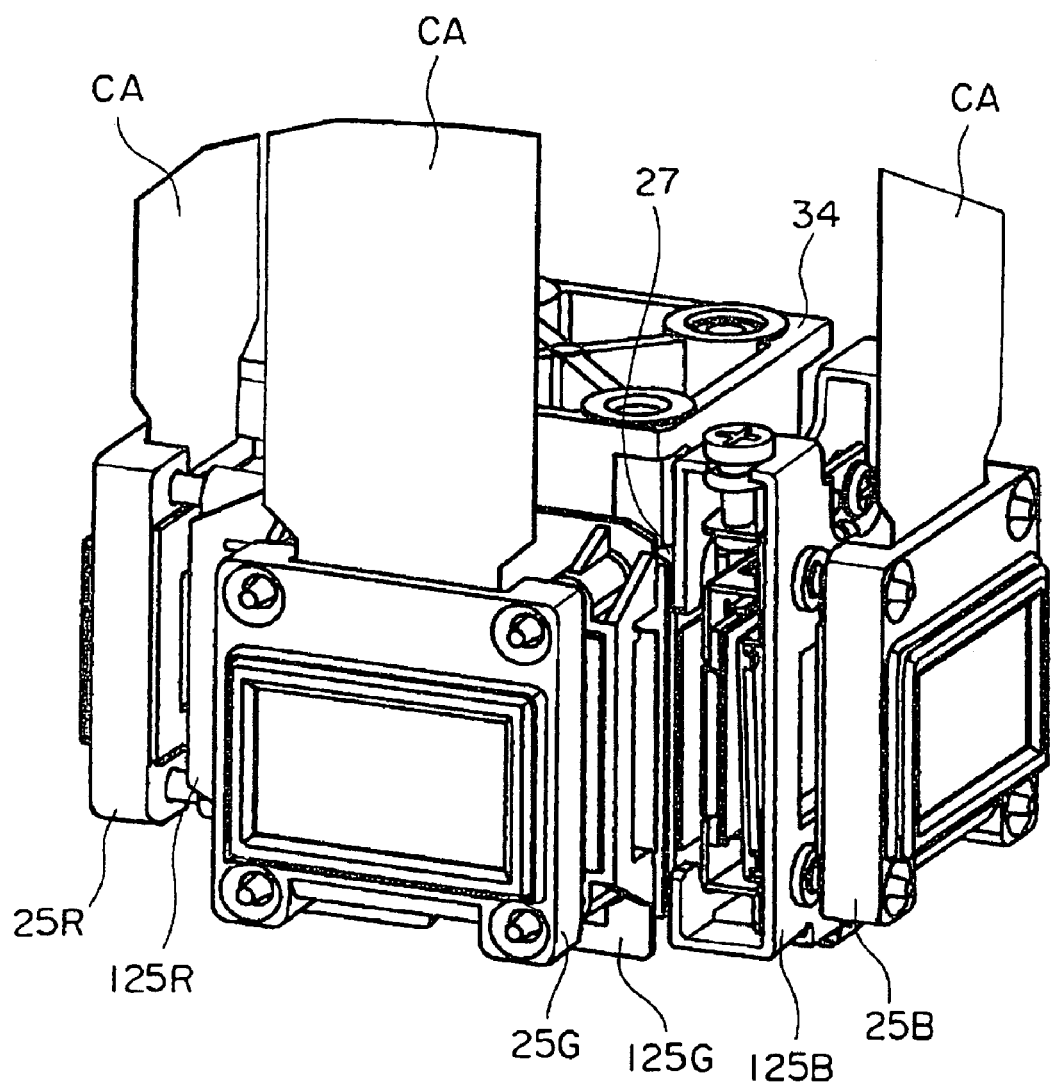
FIG. 4 is a schematic illustrating a structure of a POP unit shown in FIG. 3.

FIG. 4 is a schematic illustrating a structure of the POP unit 33 shown in FIG. 3. This POP unit 33 includes the cross dichroic prism 27, optical modulation units 25R, 25G, 25B, and emission filter units 125R, 125G, 125B. The cross dichroic prism 27 at the back is fixed to the mount member 31 of FIG. 3 via a connection member 34. The emission filter units 125R, 125G, 125B are aligned with and adhered to three incident side surfaces of the cross dichroic prism 27, respectively. Furthermore, the optical modulation units 25R, 25G, 25B are aligned with and fixed opposite these emission filter units 125R, 125G, 125B, respectively. The emission filter units 125R, 125G have the second polarizing filters 25h, 25i shown in FIG. 2 built-in, respectively, while the emission filter unit 125B has the optical compensation element 26c and the second polarizing filter 25j built-in. The optical modulation units 25R to 25B have the liquid crystal light valves 25a to 25c shown in FIG. 2 built-in, respectively. A flat type wiring cable CA extends from each of the optical modulation units 25R, 25G, 25B.

Referring back to FIG. 3, first incident filter units 225R, 225G, 225B and second incident filter units 325R, 325G that configure the optical modulation section 25 are disposed in the periphery of the POP unit 33. The first incident filter units 225R to 225B have the first polarizing filters 25e to 25g shown in FIG. 2 built-in, respectively, while the second incident filter units 325R, 325G have the optical compensation elements 26a, 26b built-in, respectively. Additionally, the second incident filter unit, i.e., the optical compensation element is not provided at the next stage of the first incident filter unit 225B for the B light. The reason is that the optical compensation element on the incident side is omitted and the optical compensation element 26c is disposed on the emission side of the liquid crystal light valve 25c, as will be described later, in consideration of the fact that ultraviolet light is more or less incident on an optical path for the B light. Upon assembly, the mount member 31 mounted with the projection lens 29, the POP unit 33, etc. is slidingly moved as a unit downwardly in a Z direction until abutment is formed, thereby fitting the POP unit 33, i.e., the cross dichroic prism 27, etc. into a recession provided in the base member 30. In this state, the mount member 31 and the base member 30 are appropriately fixed in place, thereby ensuring optical alignment of the color separating optical system 23, the optical modulation section 25, etc.

Figure 5:
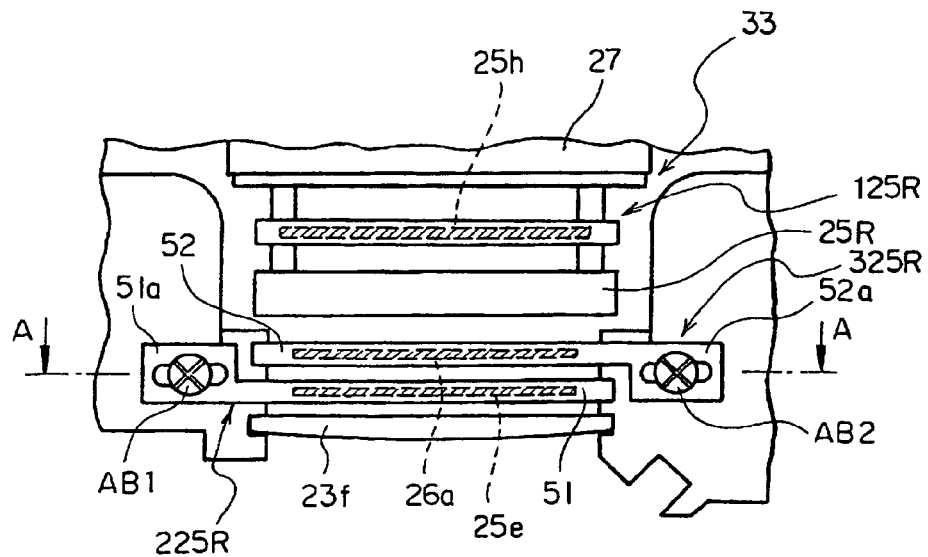
FIG. 5 is a schematic of an optical modulation section for R light as seen from above.
Figure 6:
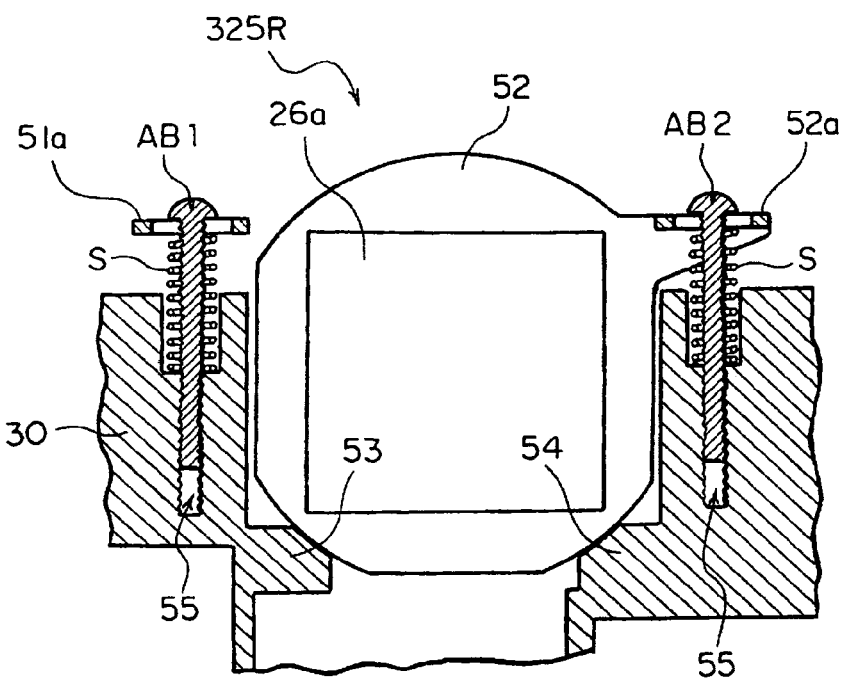
FIG. 6 is a schematic of an incident filter unit for the R light.

FIG. 5 is a schematic illustrating structures of the first incident filter unit 225R and second incident filter unit 325R for the R light, FIG. 6 is a schematic of both incident filter units 225R, 325R. In the first incident filter unit 225R, the polarizing filer 25e is supported on support portions 53, 54 of the base member 30 while being held by a frame 51. The frame 51 is formed into a disk as a whole and also formed with a stay 51a projecting laterally therefrom. The stay 51a is formed with a slot through which can be inserted an adjusting bolt AB1 to adjust the position of attachment of the frame 51 to the liquid crystal light valve 25a. That is, the frame 51 is supported at two points of the support portions 53, 54 provided on the base member 30 and is attached so as to allow micro-adjustment of the polarization direction of the illumination light of the R color transmitted through the field lens 23f.

In the second incident filter unit 325R, the optical compensation element 26a is supported at two points of the support portions 53, 54 provided on the base member 30 while being held by a disk-like frame 52 as with the case of the polarizing filter 25e. Thus, polarized light passed through the polarizing filter 25e is provided with the desired phase difference.

In the above, the frame 51 for the polarizing filter 25e and the frame 52 for the polarizing filter 26a, formed to have the same shape, are attached to the base member 30 in opposite directions. Thereby, the configuration is such that the polarizing filter 25e and the optical compensation element 26a have the stay 51a and a stay 52a projecting laterally from the opposite sides thereof to each other, respectively (see FIG. 5). The adjusting bolts AB1, AB2 inserted through the slots of the stays 51a, 52a are bolted into bolt holes 55, 55 provided in the base member 30. Furthermore, springs S to urge the stays 51a, 52a upwardly are disposed between the stays 51a, 52a and the base member 30. The springs S each include a spring coil, and the adjusting bolts AB1, AB2 are inserted through the center portions thereof, thereby restraining the springs S from disengaging from between the stays 51a, 52a and the base member 30.

Figure 7:
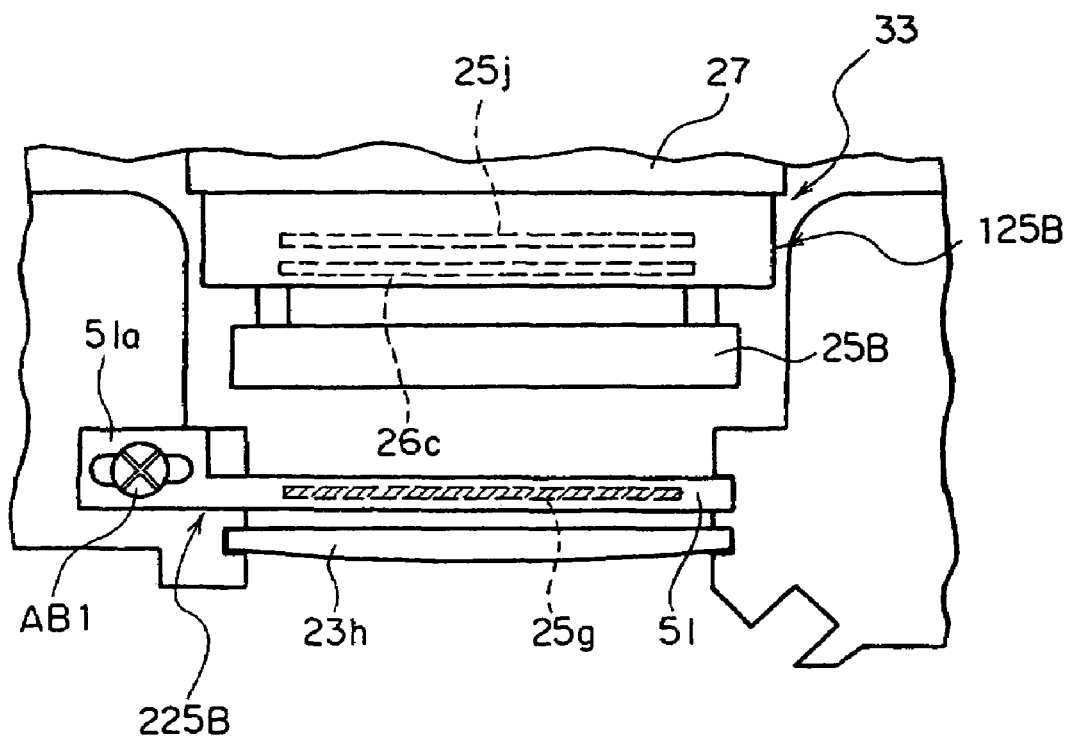
FIG. 7 is a schematic of an optical modulation section for B light as seen from above.

FIG. 7 is a schematic illustrating a structure of the first incident filter unit 225B for the B light. In this first incident filter unit 225B, the polarizing filter 25g is supported at two points of the support portions (not shown) provided on the base member 30 while being held by the disk-like frame 51 as with the case of the polarizing filer 25e shown in FIGS. 5 and 6. Thus, the amount of tightening of the adjusting bolt AB1 is adjusted, thereby enabling micro-adjustment of the polarization direction of the illumination light of the B color transmitted through the field lens 23h.

The first incident filter unit 225G and second incident filter unit 325G for the G light have the same structures as the first incident filter unit 225R and second incident filter unit 325R for the R light, respectively. Therefore, although a detailed description is omitted, the polarizing filter 25f can micro-adjust the polarization direction of the illumination light of the G light transmitted through the field lens 23g.

Figure 8:
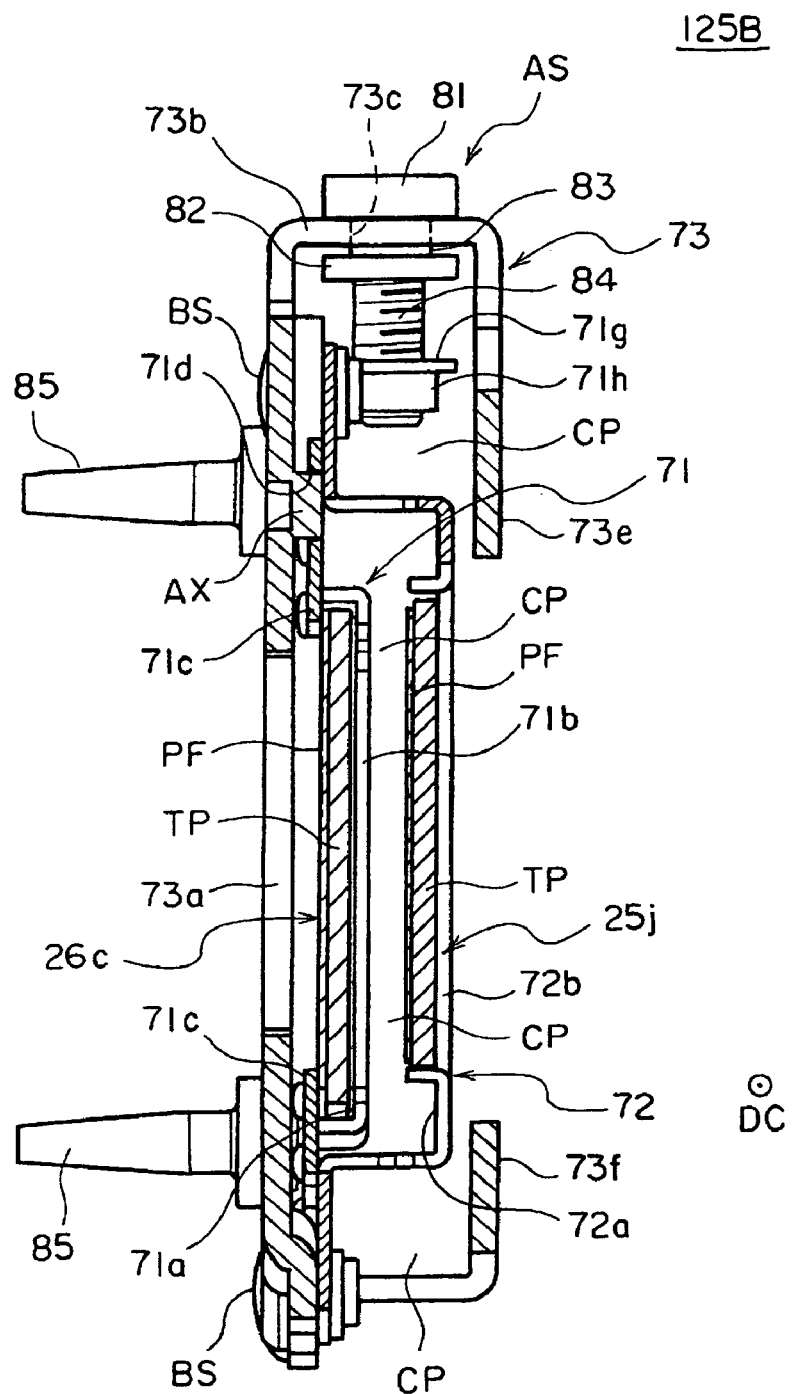
FIG. 8 is a schematic of an emission filter unit for the B light.
Figure 9:
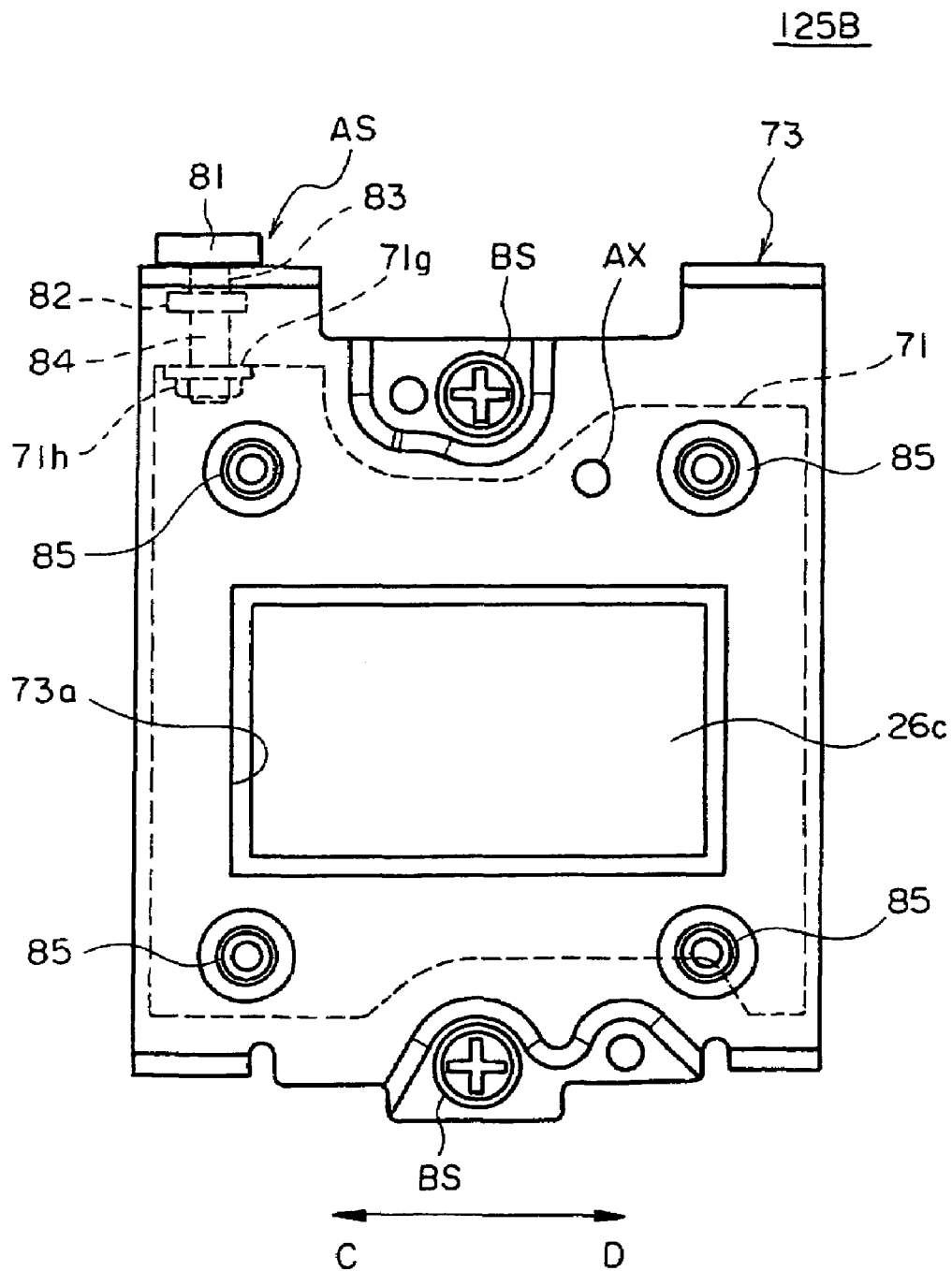
FIG. 9 is a schematic of the emission filter unit for the B light.

FIG. 8 is a schematic of the emission filter unit 125B that is adhered to the cross dichroic prism 27 in the POP unit 33. FIG. 9 is a schematic of the emission filter unit 125B. This emission filter unit 125B functions as a holding member to hold the optical compensation element 26c, etc. The emission filter unit 125B is made up of a movable frame 71 to fix the optical compensation element 26c, a stationary frame 72 to fix the polarizing filter 25j, and a main body member 73 to house the movable frame 71 and the stationary frame 72, each of which frames and member is formed by sheet metal processing.

The movable frame 71, having a rectangular outer shape as a whole, includes a rectangular opening 71b in a groove-like stepped portion 71a having a shallow center. The optical compensation element 26c is fitted into this stepped portion 71a and fixed by a clip portion 71c. This clip portion 71c presses the optical compensation element 26c by a predetermined urging force against the bottom of the stepped portion 71a. Thus, the optical compensation element 26c is pushed by a predetermined or greater stress in a groove direction, i.e., in a lateral direction CD, thereby enabling the optical compensation element 26c to slide in the lateral direction CD. This makes it possible to replace the optical compensation element 26c with the emission filter unit 125B remaining fixed to the cross dichroic prism 27. Additionally, the optical compensation element 26c is formed by attaching a WV film PF, with an adhesive or two-sided tape, onto a transparent plate TP made of glass or plastics. The movable frame 71, sandwiched between the main body member 73 and the stationary frame 72 fixed thereto, has a circular opening 71d that engages a shaft AX projecting from the main body member 73. Thereby, the movable frame 71 is supported on the main body member 73 so as to be rotatable about the shaft AX serving as a pivot shaft, thus enabling the optical compensation element 26c to rotate about the shaft AX. Specifically, the WV film PF is rotated within a plane perpendicular to the optical axis, so that the polarized light passed through the liquid crystal valve 25c shown in FIG. 7, etc. is provided with the desired phase difference, thus enabling proper optical compensation. Besides, a corner portion of the movable frame 71 is bent into an L shape, thereby forming a stay 71g, and the leading end of an adjusting screw AS extending from the main body member 73 side is screwed into a screw hole 71h of this stay 71g. Thereby, the movable frame 71 can be fixed to the main body member 73 in a proper rotational position, thus enabling stable holding of the movable frame 71, i.e., the optical compensation element 26c.

The stationary frame 72, also having a rectangular outer shape as a whole, includes a rectangular opening 72b in a groove-like stepped portion 72a having a deep center. The polarizing filter 25j is fitted into this stepped portion 72a and fixed with an adhesive, etc. Additionally, the polarizing filter 25j is formed by attaching a polarizing film PF, with an adhesive or two-sided tape, onto the transparent plate TP made of glass or plastics. The stationary frame 72 is fixed by a screw BS to the main body member 73 across the movable frame 71, which prevents the movable frame 71 from dropping off but does not allow the polarizing filter 25j to rotate as in the case of the movable frame 71.

The main body member 73, having a rectangular outer shape as a whole but having a larger contour than the movable frame 71 and the stationary frame 72, has a rectangular opening 73a in the center. The main body member 73 has a groove 73c at an end of a U-section upper portion 73b, and the adjusting screw AS serving as an adjusting screw member can be attached in this groove 73c. The adjusting screw AS includes a head 81 having a cross groove to insert a screwdriver therein, an annular collar portion 82 formed at a predetermined distance close to the head 81, a retention groove 83 formed between the head 81 and the collar portion 82, and a threaded portion 84 extending to the tip end from the collar portion 82. The screwdriver is inserted into the head 81 for rotation, thereby enabling adjustment of the distance between the upper portion 73b of the main body member 73 and the stay 71g of the movable frame 71. Therefore, this makes it possible to adjust the rotational position of the movable frame 71, i.e., the optical compensation element 26c, and furthermore to stably fix the optical compensation element 26c. Additionally, a pair of upper and lower abutment members 73e, 73f on the back side of the main body member 73, to abut a side surface of the cross dichroic prism 27, is stationarily fixed with an adhesive or two-sided tape. Insertion pins 85 that are inserted into holding holes provided in the optical modulation unit 25B shown in FIG. 4 are attached to four corners of the main body member 73. The optical modulation unit 25B can be fixed to the cross dichroic prism 27, etc. with these insertion pins 85 as a guide. Additionally, a predetermined clearance is formed between the holding holes of the optical modulation unit 25B and the insertion pins 85. Thus, precise alignment of the optical modulation unit 25B and the cross dichroic prism 27 is possible when the optical modulation unit 25B is fixed to the insertion pins 85 utilizing an epoxy resin, etc. Besides, the members 71, 72, 73 configuring the emission filter unit 125B are parts formed by sheet metal processing and, as is apparent even from FIG. 8, etc., are structured to ensure a wide air-cooling path CP to enable ventilation in a lateral direction perpendicular to the optical axis. As a result, the optical compensation element 26c and the polarizing filer 25j can be effectively cooled, thus enabling suppression of variations and deterioration in imaging characteristics.

Figure 10B:
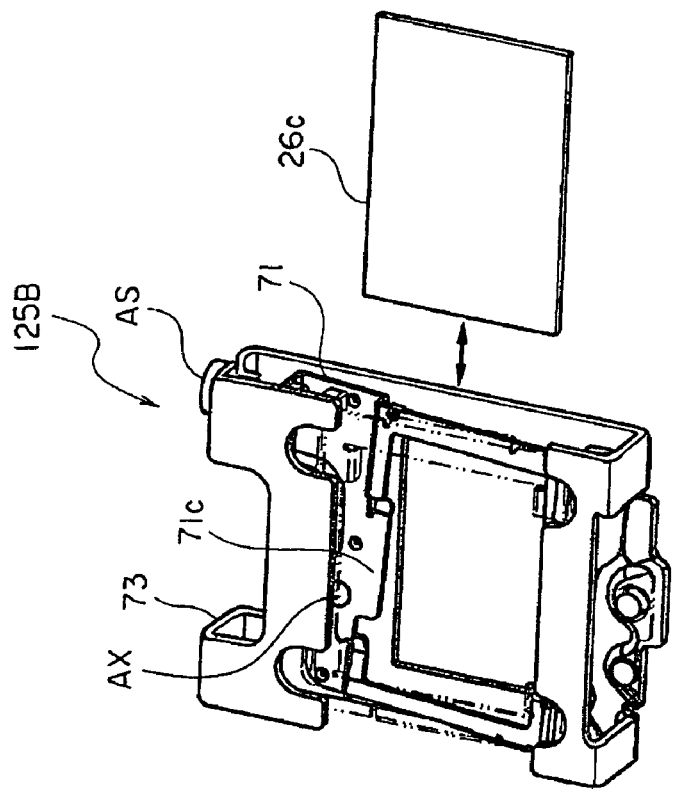
FIGS. 10(A) and (B) are schematics illustrating a function of the emission filter unit for the B light.
Figure 10A:
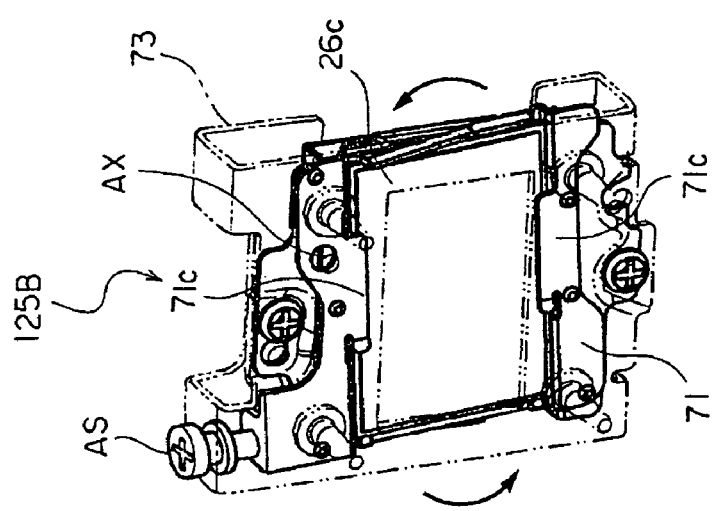

FIGS. 10A and 10B are schematics illustrating a function of the emission filter unit 125B. As shown in FIG. 10(A), the movable frame 71 is rotatable about the shaft AX with respect to the main body member 73 and the stationary frame 72, thus enabling adjustment of the rotational position in which the optical compensation 26c held by the movable frame 71 rotates within the plane thereof. As shown in FIG. 10(B), the movable frame 71 detachably holds the optical compensation element 26c, so that when the movable frame 71 is deteriorated in its characteristics, the optical compensation element 26c can be replaced with a new one.

The aforesaid is the description of the structure of the emission filter unit 125B for the B light. However, the other emission filter units 125R, 125G for the RG light are different therefrom only in that the second polarizing filters 25h, 25i are fixed to a holder and such a holder is adhered to a corresponding side surface of the cross dichroic prism 27. Thus, a detailed description thereof will be omitted.

A description will hereinafter be given of the assembly of the POP unit 33, etc. shown in FIG. 3. First, three emission filter units 125R, 125G, 125B are fixed, while being aligned with, three incident surfaces of the cross dichroic prism 27. Next, three optical modulation units 25R, 25G, 25B are aligned with and fixed opposite these emission filter units 125R, 125G, 125B. Then, the cross dichroic prism 27 is fixed to the mount member 31 via the connection member 34. The mount member 31 thus assembled is fixed to the base member 30. On this occasion, the optical modulation section 25, etc. on the mount member 31 side and the color separating optical system 23, etc. on the base member 30 side are optically aligned with each other. Thereafter, for example, by appropriately rotating the adjusting bolts AB1 of the first incident filter units 225R to 225B for the individual colors while measuring an image projected onto the transmission screen member 18, adjustment is made to obtain the position at which to enhance the contrast of the projected image. Furthermore, by appropriately rotating the adjusting bolts AB2 of the second incident filter units 325R, 325G and the adjusting screw AS of the incident filter unit 125B while measuring an image projected onto the transmission screen member 18, adjustment is made to obtain the position at which to enhance the contrast of the projected image. The rotational positions of the first polarizing filters 25e to 25g and the optical compensation elements 26a to 26c are repeatedly adjusted as above, which can gradually enhance the contrast of the projected image.

A description will hereinafter be given of the overall operation of the projector 10 of this exemplary embodiment shown in FIG. 1, etc. The source light from the light source device 21 is color-separated into beams by the color separating optical system 23, and the separate beams are incident as illumination light on the liquid crystal light valves 25a to 25c for the respective colors provided in the optical modulation section 25. The liquid crystal light valves 25a to 25c, which are modulated by image signals and thus have two-dimensional refractive index distributions, two-dimensionally spatially modulate the illumination light in pixel units. Thus, the illumination light modulated on a per color basis by the optical modulation section 25, i.e., image light is combined by the cross dichroic prism 27 and incident on the projection lens 29. The image light incident on the projection lens 29 is projected onto the transmission screen member 18. Here, the optical compensation elements 26a to 26c are disposed before and after the liquid crystal light valves 25a to 25c. Therefore, an unintended phase difference generated on the incident and emission sides of the liquid crystal light valves 25a to 25c for the individual colors is eliminated by adjustment of the rotational positions of the optical compensation elements 26a to 26c. Thus, it is possible to enhance the contrast of a color image displayed on the transmission screen member 18. In the case of the B light including ultraviolet light in part, the optical compensation element 26c is disposed at the subsequent stage of the liquid crystal light valve 25c. Therefore, the optical compensation element 26c can be reduced or prevented from deteriorating with age, as compared with when the optical compensation element 26c is disposed at the preceding stage of the liquid crystal light valve 25c. Thus, the contrast of the image display can be maintained over a long period of time.

Exemplary aspects of the invention have been described above in line with the exemplary embodiment but is not limited to the above exemplary embodiments. In the above exemplary embodiment, only in the case of the B light, the optical compensation element 26c is disposed at the subsequent stage of the liquid crystal light valve 25c. However, the same structure as the aforesaid can be adopted even in the cases of the R light and the G light. Even in these cases, the optical compensation elements 26a to 26c can be kept from deteriorating. Specifically, the second incident filter units 325R, 325G are omitted, and the emission filter units 125R, 125G are replaced with the equivalent of the emission filter unit 125B.

In the above exemplary embodiment, the second polarizing filters 25h to 25j are set to be stationary. However, the configuration may be made as follows. For example, with the first polarizing filters 25e to 25g being fixed, the second polarizing filters 25h to 25j can be angle-adjusted with a system similar to the emission filter unit 125B. That is, when the system of adjusting the first emission filters 25e to 25g cannot be provided on the incident sides of the liquid crystal light valves 25a to 25c, or when the cost for the amount of upsizing due to the rotational adjustment of the first polarizing filters 25e to 25g need be reduced in terms of an illumination range, the first polarizing filter 25e to 25g side is set to be stationary. And, in the emission filter unit 125B, when the second polarizing filter 25j, instead of the optical compensation element 26c, is attached to its position, then the rotational position of the second polarizing filter 25h can be adjusted. Furthermore, even in the cases of the other colors, when systems similar to the emission filter unit 125B are assembled in place of the emission filter units 125R, 125G and then the second polarizing filters 25h, 25i, instead of the optical compensation element 26c, are attached to its position, then the rotational positions of the second polarizing filters 25h, 25i can be adjusted.

What is claimed is:

1. An optical assembly, comprising:
an optical unit for a predetermined color having a transmissive optical modulation element that is illuminated by illumination light;
a first polarizing plate disposed directly opposite an incident side of the optical modulation element;
a second polarizing plate disposed on an emission side of the optical modulation element;
an optical compensation element disposed between the optical modulation element and the second polarizing plate, a clip portion pressing the optical compensation element by a predetermined force;
a holding member to hold the optical compensation element so as to allow adjustment of a rotational position thereof about an optical axis, the holding member including: a movable frame to fix the optical compensation element; a main body member to house the movable frame and support the movable frame rotatably about the optical axis via a pivot shaft; and an adjusting screw to adjust a predetermined portion provided in a periphery of the movable frame to fix the movable frame to the main body member in a direction perpendicular to the optical axis; and
a light combining device that is disposed on the emission side of the second polarizing plate assembled in the optical unit and that combines image light from the optical unit for the predetermined color and image light of another color and emits the combined image light,
the movable frame detachably fixing the optical compensation element, and
the movable frame holding the optical compensation element slidably in a lateral direction perpendicular to the optical axis in response to a predetermined or greater force, thereby allowing the optical compensation element to be detachable.

2. An optical assembly, comprising:
an optical unit for a predetermined color having a transmissive optical modulation element that is illuminated by illumination light;
a first polarizing plate disposed directly opposite an incident side of the optical modulation element;
a second polarizing plate disposed on an emission side of the optical modulation element;
an optical compensation element disposed between the optical modulation element and the second polarizing plate;
a holding member to hold the optical compensation element so as to allow adjustment of a rotational position thereof about an optical axis, the holding member including: a movable frame to fix the optical compensation element; a main body member to house the movable frame and support the movable frame rotatably about the optical axis via a pivot shaft; and an adjusting screw to adjust a predetermined portion provided in a periphery of the movable frame to fix the movable frame to the main body member in a direction perpendicular to the optical axis; and
a light combining device that is disposed on the emission side of the second polarizing plate assembled in the optical unit and that combines image light from the optical unit for the predetermined color and image light of another color and emits the combined image light,
the main body member housing a stationary frame for holding the second polarizing plate.

3. The optical assembly according to claim 1, the holding member including an air-cooling path to allow ventilation in a direction perpendicular to the optical axis.

4. The optical assembly according to claim 1, the holding member being an assemblage of parts formed by sheet metal processing.

5. The optical assembly according to claim 1, the light combining device being a cross dichroic prism with a pair of dielectric multilayer films built-in.

6. The optical assembly according to claim 5, the holding member being adhered to an incident surface of the cross dichroic prism.

7. A projector, comprising:
the optical assembly according to claim 1;
an illumination optical system to allow illumination light beams of individual colors including the predetermined color to be separately incident on the optical unit for the predetermined color and an optical unit for another color, respectively, which units are assembled in the optical assembly; and
a projection optical system to project the image light combined by way of the light combining device assembled in the optical assembly.

* * * * *